(12) United States Patent
Weber et al.

(10) Patent No.: US 10,053,162 B2
(45) Date of Patent: Aug. 21, 2018

(54) VEHICLE SUBSTRUCTURE

(71) Applicant: Dr. Ing. h.c. F. Porsche Aktiengesellschaft, Stuttgart (DE)

(72) Inventors: Sebastian Weber, Esslingen (DE); Tobias Posch, Wimsheim (DE); Nadine Abel, Eberdingen-Nussdorf (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/622,141

(22) Filed: Jun. 14, 2017

(65) Prior Publication Data

US 2017/0361882 A1    Dec. 21, 2017

(30) Foreign Application Priority Data

Jun. 16, 2016    (DE) .................. 10 2016 111 026

(51) Int. Cl.
*B62D 37/02* (2006.01)
*B62D 35/00* (2006.01)

(52) U.S. Cl.
CPC ........... *B62D 37/02* (2013.01); *B62D 35/007* (2013.01)

(58) Field of Classification Search
CPC .............................. B62D 37/02; B62D 35/007
USPC ............................................. 296/180.1, 180.5
See application file for complete search history.

(56) References Cited

U.S. PATENT DOCUMENTS

| | | | | |
|---|---|---|---|---|
| 4,889,382 A | * | 12/1989 | Burst .................. | F01P 11/10 296/180.5 |
| 5,923,245 A | * | 7/1999 | Klatt .................. | B60Q 1/302 180/68.3 |
| 2006/0186698 A1 | * | 8/2006 | Roth .................. | B62D 35/007 296/180.1 |

* cited by examiner

*Primary Examiner* — Joseph D. Pape
(74) *Attorney, Agent, or Firm* — Leydig, Voit & Mayer, Ltd.

(57) ABSTRACT

A vehicle substructure includes at least one wing device for producing at least one underflow and at least one overflow from inflowing air to improve a downforce, the at least one wing device having at least one air-guiding apparatus for dividing the inflowing air into at least one wing air flow for the underflow of the wing device and into at least one structure air flow for at least one vehicle component. The air-guiding apparatus includes at least one adaptable air-guiding element. A dividing ratio of the at least one wing air flow and the at least one structure air flow can be flexibly set by at least one adaptation of the air guiding element.

16 Claims, 4 Drawing Sheets

VEHICLE SUBSTRUCTURE

CROSS REFERENCE TO RELATED APPLICATIONS

This application claims benefit to German Patent Application No. DE 10 2016 111 026.4, filed Jun. 16, 2016, which is hereby incorporated by reference herein.

FIELD

The present invention relates to a vehicle substructure with at least one wing device for producing at least one underflow and at least one overflow from inflowing air to improve the downforce.

BACKGROUND

At increasing speed, motor vehicles experience an unfavorably reduced ground adhesion because of lifting forces. This may lead, in particular in weight-optimized high power vehicles with an extremely streamlined configuration, for example sports cars, to critical driving situations. Therefore, such vehicles are frequently equipped with wings and in particular with rear wings to improve the driving behavior. Said wings have an aerodynamic configuration which, in the manner of an inverted airfoil of an aircraft, improves the downforce.

It is generally attempted to supply such wings with as large an amount as possible of air flowing past, so that the desired improvement in the driving behavior occurs. In particular, as large an underflow as possible is intended to be available on the curved lower side of the wing in order to intensify the downforce.

However, a problem with this is that the air flowing past the vehicle is generally also intended to be used for other purposes than for the underflow. The air flow can be particularly advantageously used, for example, for cooling charge air.

The prior art has therefore disclosed, for example, rear wings which are mounted on a lower shell with a flow edge located at the front in the flow direction. The flow edge divides the inflowing air into a portion for the underflow and into a portion for the charge air cooling.

However, it is disadvantageous that, with increasing speed, the desired amount of air for the underflow is no longer available. Such rear wings therefore do not provide the desired improvement in the driving behavior under certain driving conditions.

SUMMARY

In an embodiment, the present invention provides a vehicle substructure. The vehicle substructure includes at least one wing device for producing at least one underflow and at least one overflow from inflowing air to improve a downforce, the at least one wing device having at least one air-guiding apparatus for dividing the inflowing air into at least one wing air flow for the at least one underflow of the wing device and into at least one structure air flow for at least one vehicle component. The at least one air-guiding apparatus includes at least one adaptable air-guiding element. A dividing ratio of the at least one wing air flow and the at least one structure air flow can be flexibly set by at least one adaptation of the at least one air guiding element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
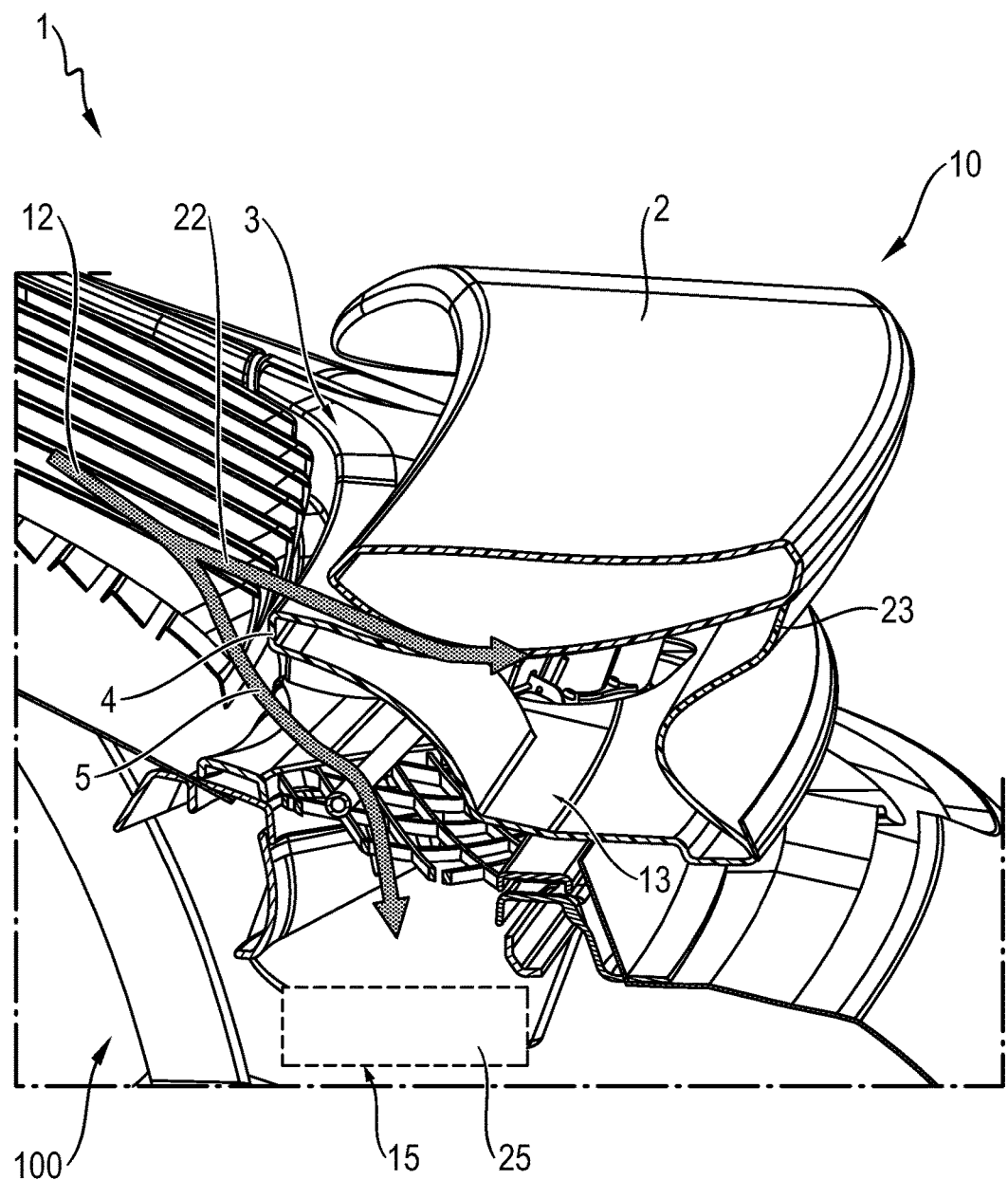
FIG. 1 shows a schematic illustration of a vehicle substructure according to the invention, attached to a carrier vehicle, in a perspective, sectioned view.

A vehicle substructure is described herein which provides a favorable division of the inflowing air with an improved downforce behavior.

Vehicle substructures described herein can include at least one wing device for producing at least one underflow and preferably at least one overflow from inflowing air to improve the downforce. The vehicle substructures can include at least one air-guiding apparatus for dividing the inflowing air into at least one wing air flow for the underflow of the wing device and into at least one structure air flow for at least one vehicle component. The air-guiding apparatus can include at least one adaptable air-guiding element. In this case, by means of at least one adaptation of the air-guiding element, a dividing ratio of wing air flow and structure air flow can be flexibly set.

Vehicle substructures described herein can have many advantages. A considerable advantage can be that at least one adaptable air-guiding element is provided. As a result, a division of the inflowing air into the wing air flow and the structure air flow is possible. The dividing ratio can be set flexibly here.

For example, the dividing ratio can be set in such a manner that a large portion is available for the wing air flow and therefore a particularly powerful downforce is achieved. Since the dividing ratio can be set flexibly, the portion for the structure air flow can also be increased when required and therefore a stronger cooling air flow can be provided. The vehicle substructure according to the invention therefore provides a division of the inflowing air along with a considerable improvement of the driving behavior and in particular by means of a downforce which can be set.

The wing device can include in particular at least one curved upper side and at least one curved lower side. The lower side here can be in particular curved more greatly than the upper side such that a downforce can be produced. In order to produce the underflow, the wing device can be in particular arranged spaced apart from a body of a carrier vehicle. The wing device can be arranged in particular transversely with respect to the direction of travel of the carrier vehicle.

Such a wing device can be distinguished from separation edges and other air-guiding elements on the motor vehicle.

Although such separation edges likewise obtain an aerodynamic effect, they do so according to a completely different physical principle than a wing device. In particular, separation edges, in contrast to the wing device, are not completely flowed around by air and therefore do not produce any downforce-improving underflow from the inflowing air.

The air-guiding apparatus preferably can include at least one receiving device for the air-guiding element. The air-guiding element can be in particular arranged interchangeably on the receiving device, and therefore the dividing ratio can be adapted to a driving situation to be anticipated. In particular, the receiving device and the air-guiding element can be designed as two separate components which are detachable from each other. In particular, the receiving device and the air-guiding element can be connectable to each other so as to be detachable without being destroyed.

The receiving device preferably can include at least one lower shell or is designed as such. The lower shell serves preferably for arrangement of the wing device or is part of the wing device. It is possible for the air-guiding apparatus to be of interchangeable design. It is possible here for the air-guiding element to be changeable or interchangeable by interchanging of the entire air-guiding apparatus.

An interchanging of the air-guiding element provides a particularly uncomplicated and effective adaptation in order to set the dividing ratio flexibly. It is also particularly advantageous that the dividing ratio can be adapted to changed aerodynamic conditions of the carrier vehicle by interchanging the air-guiding element.

The vehicle substructure preferably can include at least two mutually interchangeable air-guiding elements. The air-guiding elements are differentiated here preferably with respect to the dividing ratio wing air flow and structure air flow. In particular, the vehicle substructure comprises at least one plurality of different and interchangeable air-guiding elements. Such a vehicle substructure affords a particularly flexible adaptation of the dividing ratio.

In particular, the mutually interchangeable air-guiding elements can have different angles of attack. In particular, the angle of attack in relation to the inflowing air is referred to here. It is also possible for the interchangeable air-guiding elements to be arranged at different angles to the air-guiding apparatus and/or to the wing device. The air-guiding element can also comprise two or more guiding portions which are in particular interchangeable individually. The guiding portions preferably have different angles of attack.

In a particularly preferred refinement, the air-guiding element is of adjustable design. This permits a flexible setting of the dividing ratio without the air-guiding element having to be interchanged. For example, for the adjustment, the air-guiding element is at least partially extendible and/or retractable and/or rotatable and/or movable. It is also possible for the air-guiding element to have a changeable shape at least in sections and, for example, a changeable curvature and/or a changeable radius. For this purpose, the air-guiding element can be manufactured at least in sections from a flexible material.

The air-guiding element can also include two or more guiding portions which are in particular individually adjustable. The guiding portions can preferably be set at different angles of attack.

At least one angle of attack of the air-guiding element is particularly preferably of adjustable design. The angle of attack can take place, for example, by rotating and/or pivoting and/or temporarily deforming the air-guiding element. An adjustment of the angle of attack provides a particularly effective changing of the dividing ratio. The position of the air-guiding element can thus be adapted rapidly and easily in order to adapt the dividing ratio optimally to changing driving situations.

In particular, the air-guiding apparatus has at least one receiving device for receiving the air-guiding element. The air-guiding element here can be in particular connected adjustably and preferably pivotably to the receiving device. It is preferred for the air-guiding element to be pivotable at least in the direction of the wing device. The air-guiding element is preferably also pivotable in the direction of at least one flow duct for the structure air flow. For example, the air-guiding element is pivotable in such a manner that it is pivotable both in the direction of the wing device and in the direction of the flow duct for the structure air flow.

The pivot axis for the pivoting runs in particular parallel to the span of the wing device. The pivot axis is arranged in particular transversely with respect to the flow direction of the inflowing air. The pivot axis is preferably also arranged transversely with respect to the longitudinal axis of the carrier vehicle.

The air-guiding element and the receiving device can be preferably connected to each other via at least one hinge device. Such a hinge device permits a structurally uncomplicated and at the same time highly reliable pivoting of the air-guiding element on the receiving device.

It is possible for the air-guiding element to be connected integrally to the hinge device. The hinge device here can be provided by at least one flexible hinge portion of the air-guiding element. The receiving device can also be connected integrally to the hinge device. It is possible here for the hinge device to be provided by at least one flexible hinge portion of the receiving device.

For example, the hinge portion can be designed as at least one film hinge. For example, the air-guiding element is designed as a solid component with a flexible hinge portion and is fastened pivotably via the latter to the receiving device. It is also possible for the receiving device and the air-guiding element to be connected integrally to each other. The air-guiding element and the receiving device can comprise at least one flexible hinge portion here.

In a preferred embodiment, the air-guiding element is manufactured from at least two materials of differing strength. For example, the air-guiding element comprises at least one solid component and at least one soft component. The air-guiding element can be manufactured from a two-component or multi-component material. In particular, the air-guiding element can be designed as a solid component with at least one soft component. The soft component here in particular provides the hinge device and preferably the flexible hinge portion. This firstly permits a stable and reliable connection to the receiving device and at the same time flexible and smooth-running pivotability.

The air-guiding element can preferably be of flexible design. The air-guiding element can particularly preferably be manufactured from a rubber material. It is also possible for the air-guiding element to be manufactured from an elastic material and, for example, from an elastomeric plastic and/or a rubber-like material. A different flexible and/or elastic material is also possible. In particular, the flexible air-guiding element is of deformable and in particular elastically deformable design. Such configurations have the advantage that a hinge device is not required for pivoting the air-guiding element. The flexible air-guiding element can particularly preferably be deformable in such a manner that the angle of attack of the air-guiding element is adjustable.

The flexible air-guiding element can be in particular fixedly connected permanently to the receiving device or is installed detachably.

In a particularly preferred refinement, the air-guiding element is adaptable and in particular movable by means of at least one actuator device. The air-guiding element is preferably pivotable by means of the actuator device. The actuator device comprises in particular at least one motorized drive. The actuator device can be operable electrically and/or pneumatically and/or hydraulically. Such an actuator device has the advantage that the ratio for the division of the inflowing air can be set during the journey.

The actuator device is in particular operatively connected to at least one control device. The control device here is suitable and designed to set the air-guiding element by means of the actuator device depending on at least one operating state of the carrier vehicle. In particular, the air-guiding element can be set depending on a driving speed of the carrier vehicle. Setting is also possible depending on an engine load and/or a charge air temperature and/or other characteristic variables for a driving situation of the carrier vehicle. The control device and the actuator device can be designed in particular as an adaptive system. This provides a driver with convenient adaptation of the downforce behavior depending on driving situation or driving behavior.

In all the refinements, it is particularly preferred for the vehicle component to comprise at least one charge air cooling device or to be designed as such. The structure air flow is supplied here in particular to the charge air cooling device as cooling air. Such a use of the structure air flow is particularly advantageous in high performance vehicles with rear engines. The structure air flow can also be used for cooling other vehicle components. It is also possible for the structure air flow to be used for other purposes, for example for supercharging and/or cooling an internal combustion engine.

In all of the refinements, it is particularly preferred for the vehicle substructure to be designed as a rear wing apparatus or to comprise such a rear wing apparatus. The vehicle substructure is provided here in particular for a carrier vehicle with a driving engine arranged in the rear region. The rear wing apparatus can be designed in particular as a slotted wing with at least one lower shell. The lower shell in particular provides the receiving device for the air-guiding element. The wing device can be provided in particular by the slotted wing. The air-guiding apparatus can be integrated in the lower shell.

It is possible for the rear wing apparatus to be of adjustable design. For example, the rear wing apparatus can be arranged retractably or extendably on the rear of the carrier vehicle. It is possible for the rear wing apparatus to comprise two or more wing devices. The rear wing apparatus can be of multi-level design. It is possible for the wing device to comprise at least one or more flaps and/or separation edges.

Separation edges and/or flaps for adapting the flow behavior can be arranged on the wing device and/or the lower shell and/or the air-guiding apparatus.

The air-guiding element can be arranged in particular in the forward direction of the carrier vehicle beginning in front of the wing device. This permits a particularly good division of the inflowing air into wing flow and structure air flow. It is also possible for the wing device to be arranged in the forward direction beginning in front of the air-guiding element. In particular, the air-guiding element can be arranged below the wing device.

FIG. 1 shows a vehicle substructure 1 according to an embodiment of the invention which is mounted here on a carrier vehicle 100. In a preferred refinement, the vehicle substructure here is designed as a rear wing apparatus 10. The rear wing apparatus 10 is arranged in the rear region of the carrier vehicle 100. For better clarity, only a rear region of the carrier vehicle 100 is illustrated here as a detail. A sports car with a rear engine is provided, for example, as the carrier vehicle 100. The carrier vehicle 100 can also be equipped with a front engine or a mid-engine.

The rear wing apparatus 10 serves here to improve the driving behavior of the carrier vehicle 100. For this purpose, the rear wing apparatus 10 comprises a wing device 2 for producing an underflow and an overflow from inflowing air 12. The flow cross section of the wing device 2 is selected here in such a manner that the underflow is accelerated in a specific manner in relation to the overflow, thus producing a desired downforce. As a result, the ground adhesion of the carrier vehicle 100 is improved particularly at high speeds and in driving situations at the limits.

The wing device 2 is mounted here on a lower shell 23 and is fastened via the latter to the carrier vehicle 100. The underflow is guided along here between the lower side of the wing device 2 and the upper side of the lower shell 23.

The rear wing apparatus 10 is preferably fastened retractably and extendably to the carrier vehicle 100. For example, the rear wing apparatus 10 is retracted and extended depending on the driving speed of the carrier vehicle 101.

The rear wing apparatus 10 here comprises an air-guiding apparatus 3 for dividing the inflowing air 12. An air-guiding element 4 is located here on that side of the air-guiding apparatus which faces the inflowing air 12. The air-guiding element 4 causes the inflowing air 12 to be divided into a wing air flow 22 and into a structure air flow 5. To clarify the division, the air flows 5, 12, 22 are indicated here in highly schematized fashion by corresponding arrows.

The wing air flow 22 furthermore flows to the wing device 2 and is used there in particular for producing the underflow. The structure air flow 5 is deflected here by the air-guiding apparatus 3 such that it can be used for supplying a vehicle component 15. In the case of the rear wing apparatus 10 shown here, the structure air flow 5 is guided through at least one opening in the body skin to a vehicle component 15 designed as a charge air cooling device 25. By means of the division, the inflowing air 12 can thus be used both for improving the downforce behavior and for cooling the charge air cooling device 25.

In order to set the dividing ratio of wing air flow 22 and structure air flow 5 in a flexible manner, the air-guiding element 4 here is of adaptable design. The air-guiding element 4 here is adapted in such a manner that the ratio of downforce behavior to cooling behavior can be adapted flexibly via the division of the inflowing air 12.

The wing device 2 is designed here as a hollow body. The lower shell 23 and parts of the air-guiding apparatus 3 are likewise designed here as hollow bodies. The lower shell 23 also provides a receiving device 13 here for connecting the air-guiding element 4.

Figure 2:
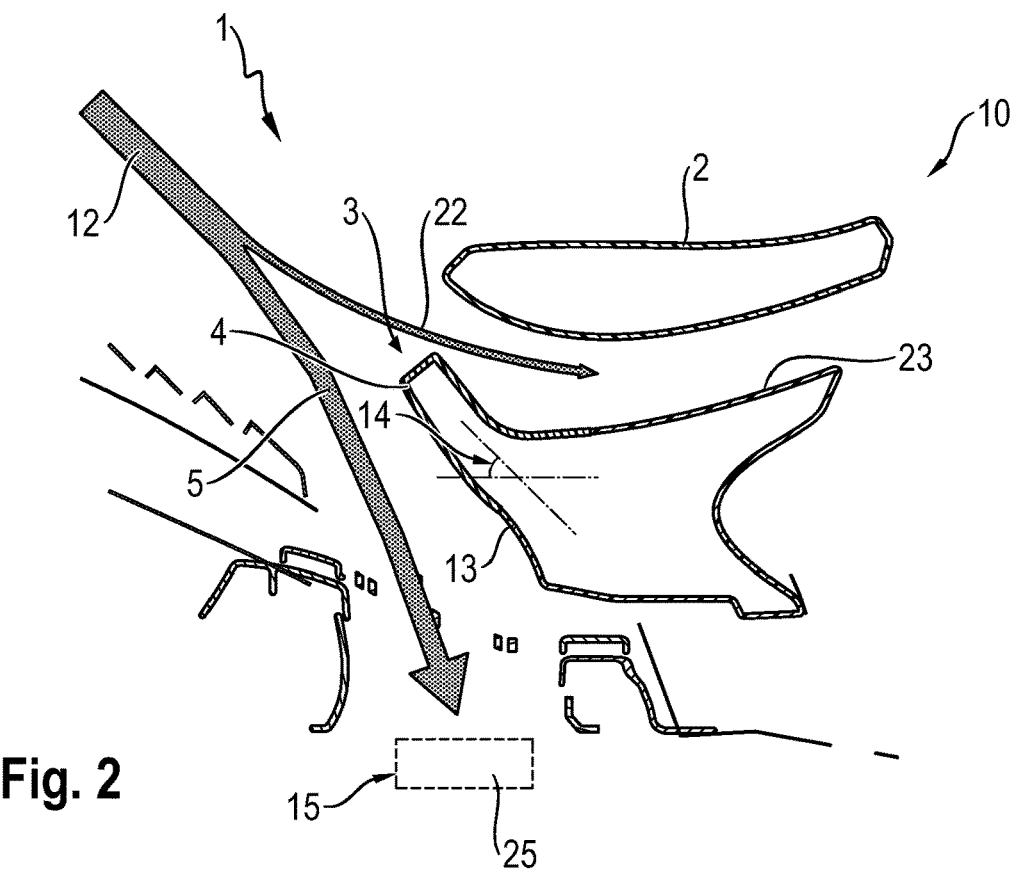
FIG. 2 shows a highly schematic illustration of a vehicle substructure in a sectioned side view.
Figure 3:
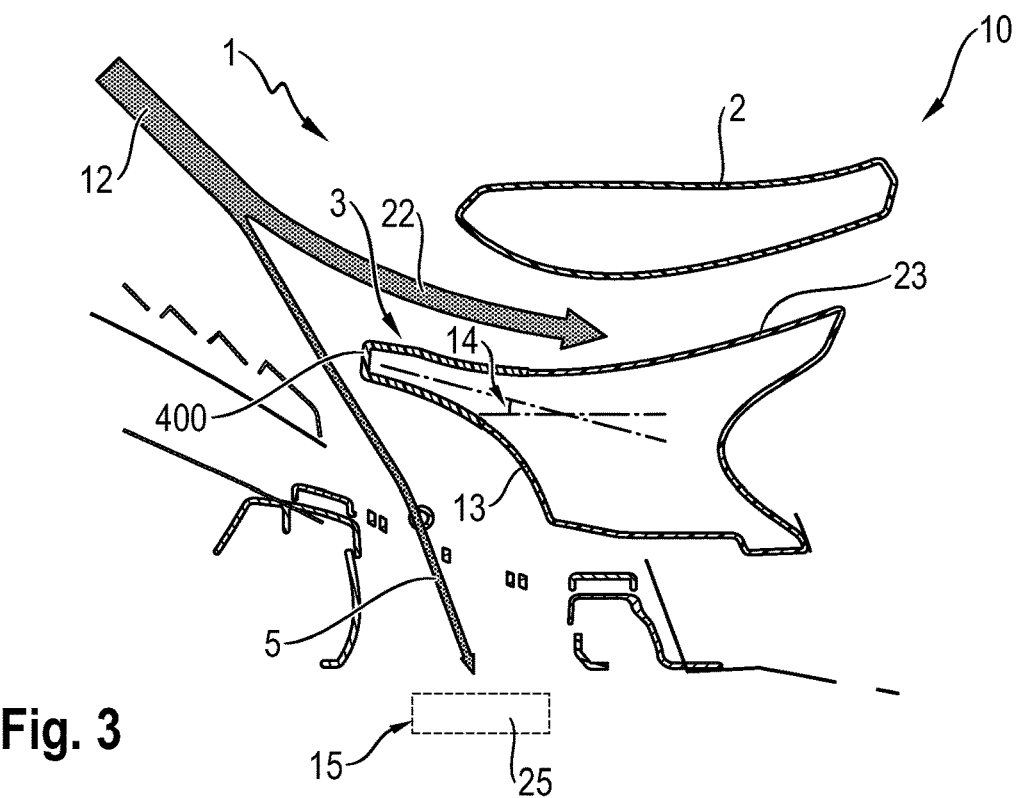
FIG. 3 shows the vehicle substructure from FIG. 2 with an adapted air-guiding element.

FIGS. 2 and 3 show a vehicle substructure 1 which is designed as a rear wing apparatus 10. Two mutually interchangeable air-guiding elements 4, 400 are provided here. By means of the interchanging, the dividing ratio of wing air flow 22 and structure air flow 5 can be flexibly adapted. For this purpose, the mutually interchangeable air-guiding elements 4, 400 have different angles of attack 14.

FIG. 2 shows an air-guiding element 4 with a steep angle of attack 14. As a result, the dividing ratio is set in such a manner that a particularly large part of the inflowing air 12 is supplied as structure air flow 5 to the charge air cooling device 25. In a corresponding manner, only a small portion of the inflowing air 12 is used as the wing air flow 22. The air-guiding element 4 shown here therefore provides an increased air throughput to the charge air cooling device 25, and therefore the downforce behavior is reduced in favor of the cooling behavior.

In FIG. 3, the air-guiding element 4 has been interchanged for another air-guiding element 400 with a shallower angle of attack 14. The dividing ratio of the inflowing air 12 has therefore been set here in favor of an improved downforce behavior. The shallower angle of attack 14 supplies a particularly large portion of the inflowing air 12 as the wing air flow 22 to the wing device 2 for producing the underflow.

In a corresponding manner, the rear wing apparatus 10 can comprise further mutually interchangeable air-guiding elements 4, and therefore the respectively desired dividing ratio can be adapted in order to coordinate downforce behavior and cooling behavior with each other in a specific manner.

For the interchanging of the air-guiding elements 4, 400, the latter, for example, are detached from a receiving device 13 of the air-guiding apparatus 3. After selection of the desired air-guiding element 4, 400, the latter is then fastened to the receiving device 13. The receiving device 13 is integrated here in the lower shell 23.

Figure 4:
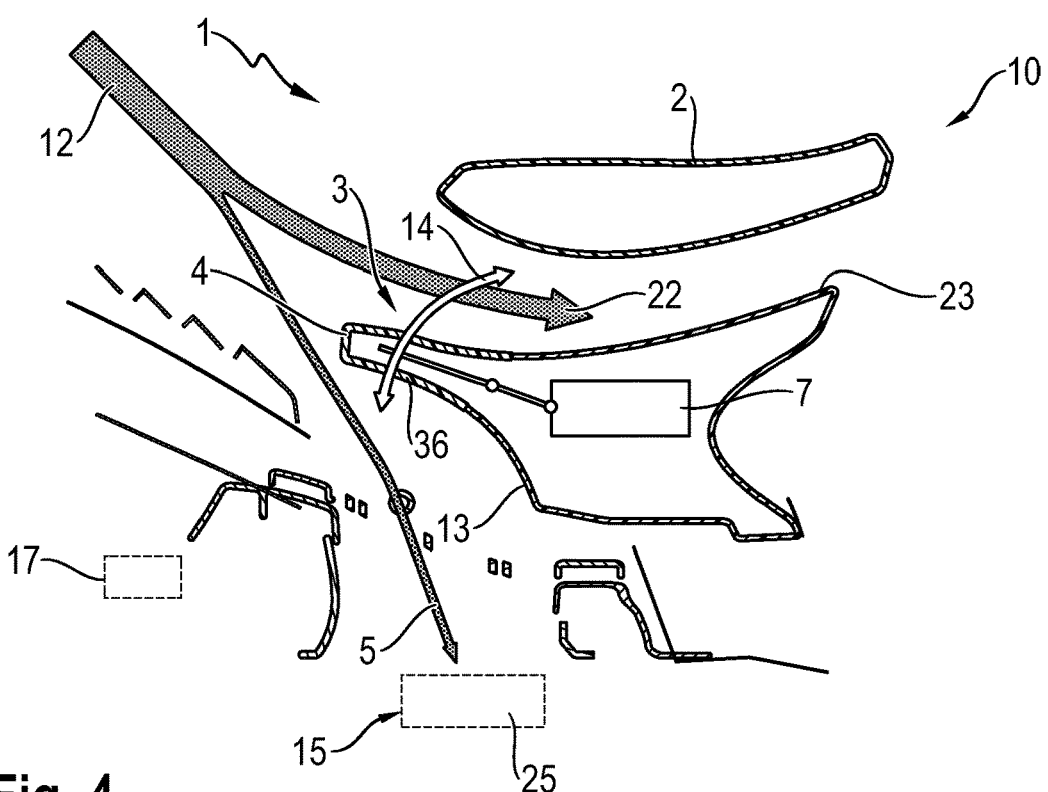
FIG. 4 shows a further highly schematic illustration of a vehicle substructure in a sectioned side view.
Figure 5:
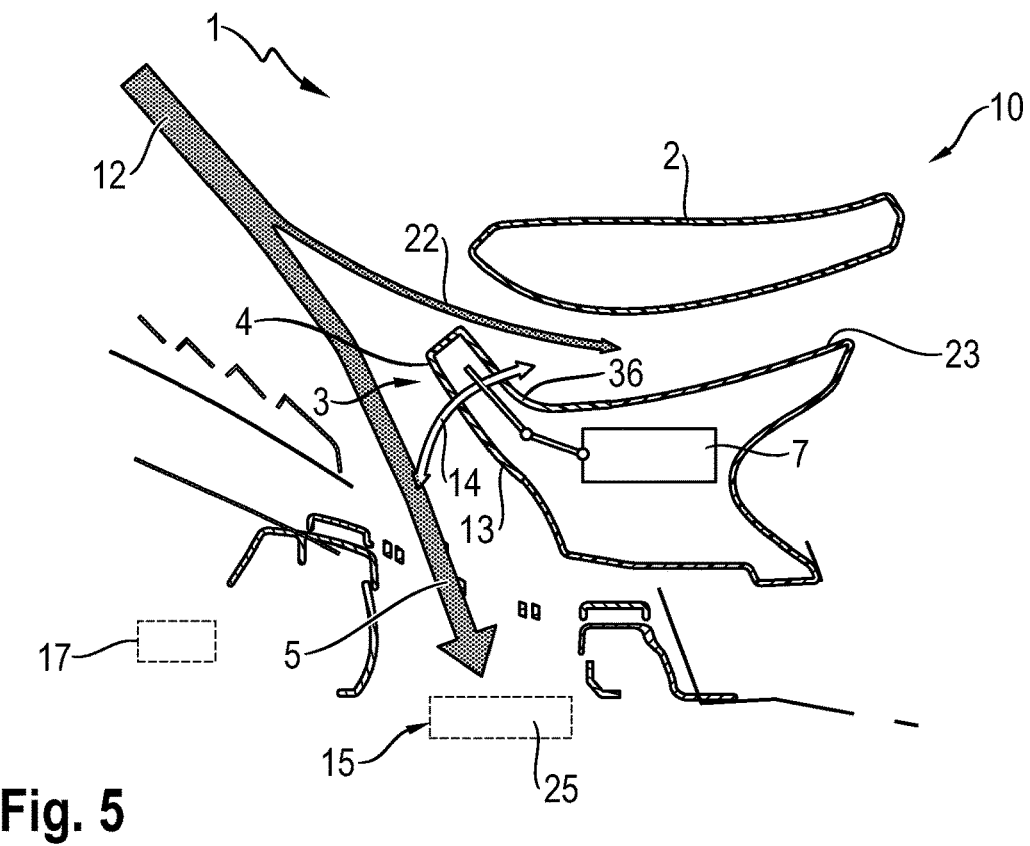
FIG. 5 shows the vehicle substructure of FIG. 4 with an adapted air-guiding element.

FIGS. 4 and 5 show a rear wing apparatus 10 with an adjustable air-guiding element 4. The angle of attack 14 is set here by means of the adjustment of the air-guiding element 4, and therefore the inflowing air 12 can be divided in a desired ratio. The air-guiding element 4 is adjusted here via an actuator device 7.

The actuator device 7 is operatively connected to a control device 17 and, together therewith, forms an adaptive system for setting the air-guiding element 4. The control device 17 is accommodated, for example, in the carrier vehicle 100 or else in the rear wing apparatus 10. An adaptive system with a controllable actuator device 7 permits a flexible setting of the dividing ratio at a desired time and without undertaking installation work.

For example, the air-guiding element 4 can be adjusted via the actuator device 7 during the journey. A setting of the dividing ratio is therefore possible depending on the driving situation or operating point of the carrier vehicle 100. For example, at a high speed or in other driving situation at the limits, a particularly high downforce can be set in order to improve the ground adhesion. In driving situations in which, for example, a very high driving power is required, the dividing ratio can be set in favor of a structure air flow 5 for the charge air cooling device 25. A setting is also possible in which the dividing ratio of structure air flow 5 and wing air flow 22 is balanced.

The setting of the air-guiding element 4 can, of course, be undertaken by the control device 17 taking into consideration corresponding parameters for the operating state and/or for a driving situation of the carrier vehicle 100. For this purpose, the control device 17 can, for example, call up other sensor devices and/or control devices of the carrier vehicle 100. However, it is also possible for a setting of the air-guiding element 4 to be provided depending on at least one user preselection. For example, the driver can undertake a desired setting of the air-guiding element 4 via an operator control device. Provision may also be made for the driver to select a certain driving program or operating program and for the control device 17 to activate the air-guiding element 4 depending on the selected program.

The air-guiding element 4 is of flexible design here and is manufactured, for example, from a rubber material or an elastomeric plastic. The flexible air-guiding element can then be correspondingly deformed by the actuator device 7 such that, for example, the angle of attack 14 changes. The flexible air-guiding element is fastened here in particular to the receiving device 13. Arranged in the flexible air-guiding element 4 is for example an adjustment device and, for example, an adjustment linkage which is actuated via the actuator device 7. A flexible air-guiding element 4 has the advantage that, because of the deformability, a movable connection to the receiving device 13 can be dispensed with.

Figure 6:
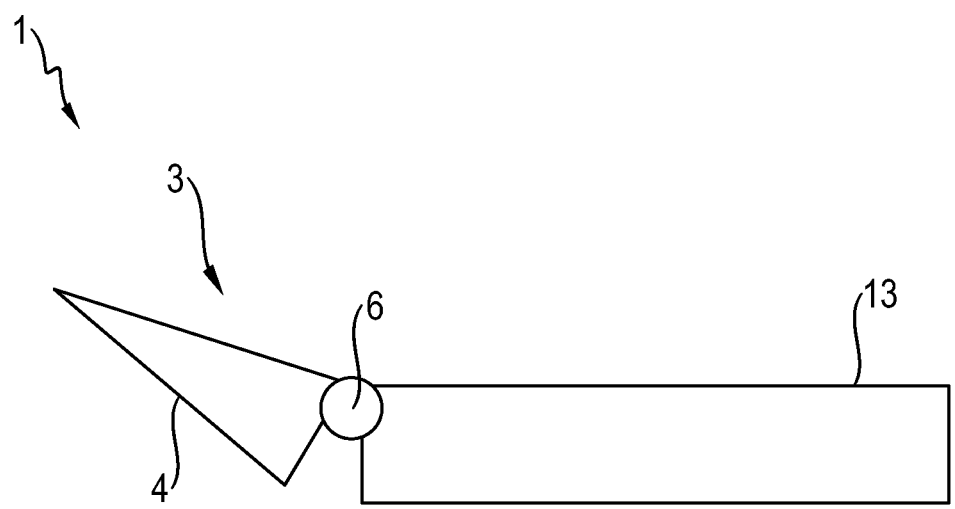
FIG. 6 shows a highly schematic illustration of an air-guiding apparatus in a sectioned side view.

FIG. 6 shows a highly schematized air-guiding apparatus 3 of a vehicle substructure 1. In the refinement shown here, the air-guiding element 4 is fastened pivotably to the receiving device 13 via a hinge device 6. By means of such a hinge device 6, air-guiding element 4 and receiving device 13 can be manufactured, for example, from a solid material.

By means of the hinge device 6, the air-guiding element 4 can then be pivoted in relation to the receiving device 13 in order to set a desired angle of attack. For this purpose, an actuator device 7 is preferably provided which, for better clarity, is not shown here. The air-guiding apparatus 3 shown here is preferably integrated in a rear wing apparatus 10, as described with respect to the previous figures.

Figure 7:
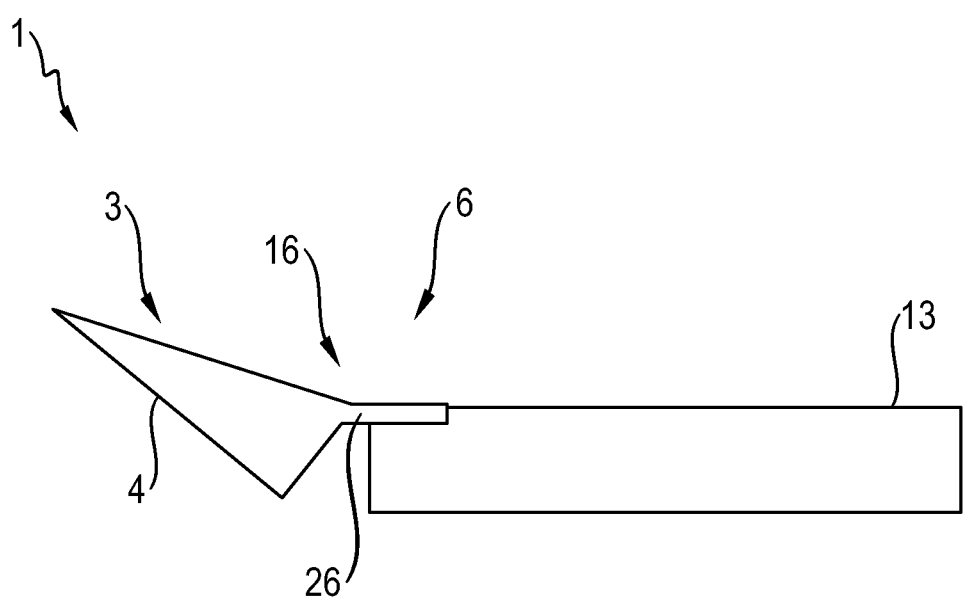
FIG. 7 shows a further highly schematic illustration of an air-guiding apparatus in a sectioned side view.

FIG. 7 shows an air-guiding apparatus 3 of a vehicle substructure 1, in which the hinge device 6 is designed as a flexible hinge portion 16. By means of the flexible hinge portion 16, the air-guiding element 4 is connected pivotably to the receiving device 13.

The hinge portion 16 is provided, for example, by a soft component 26 of the air-guiding element 4. For this purpose, the air-guiding element 4 is manufactured, for example, from two or more components. In particular, the air-guiding element 4 is designed as a solid component in which a soft component 26 is embedded in the region of the hinge portion 16. The hinge portion 16 is therefore connected integrally to the air-guiding element 4. Such an air-guiding element 4 can be produced particularly easily and at the same time provides reliable pivotability in relation to the receiving device 13.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Vehicle substructure
2 Wing device
3 Air-guiding apparatus
4 Air-guiding element
5 Structure air flow
6 Hinge device
7 Actuator device
10 Rear wing apparatus
12 Inflowing air
13 Receiving device
14 Angle of attack
15 Vehicle component
16 Hinge portion
17 Control device
22 Wing air flow
23 Lower shell
25 Charge air cooling device
26 Soft component
100 Carrier vehicle
400 Air-guiding element

The invention claimed is:

1. A vehicle substructure, comprising:
at least one wing device for producing at least one underflow and at least one overflow from inflowing air to improve a downforce, the at least one wing device having at least one air-guiding apparatus for dividing the inflowing air into at least one wing air flow for the at least one underflow of the wing device and into at least one structure air flow for at least one vehicle component,
wherein the at least one air-guiding apparatus includes at least one adaptable air-guiding element, and
wherein a dividing ratio of the at least one wing air flow and the at least one structure air flow can be flexibly set by at least one adaptation of the at least one air guiding element.

2. The vehicle substructure as claimed in claim 1, wherein the at least one air-guiding apparatus comprises at least one receiving device for the at least one air-guiding element, and wherein the at least one air-guiding element is arranged interchangeably on the receiving device.

3. The vehicle substructure as claimed in claim 1, wherein the at least one adaptable air-guiding element includes at least two mutually interchangeable air-guiding elements, wherein the at least two mutually interchangeable air-guiding elements differ with respect to the dividing ratio of the wing air flow and the structure air flow.

4. The vehicle substructure as claimed in claim 3, wherein the at least two mutually interchangeable air-guiding elements have different angles of attack.

5. The vehicle substructure as claimed in claim 1, wherein the at least one adaptable air-guiding element is of adjustable design.

6. The vehicle substructure as claimed in claim 1, wherein at least one angle of attack of the at least one adaptable air-guiding element is adjustable.

7. The vehicle substructure as claimed in claim 1, wherein the at least one air-guiding apparatus has at least one receiving device, and wherein the at least one adaptable air-guiding element is connected pivotably to the at least one receiving device.

8. The vehicle substructure as claimed in claim 7, wherein the at least one adaptable air-guiding element and the at least one receiving device are connected to each other via at least one hinge device.

9. The vehicle substructure as claimed in claim 8, wherein the at least one adaptable air-guiding element and/or the at least one receiving device is connected integrally to the hinge device, and wherein the hinge device is provided by at least one flexible hinge portion of the at least one adaptable air-guiding element and/or of the at least one receiving device.

10. The vehicle substructure as claimed in claim 8, wherein the at least one adaptable air-guiding element is designed as a solid component with at least one soft component, and wherein the soft component provides the hinge device.

11. The vehicle substructure as claimed in claim 1, wherein the at least one adaptable air-guiding element is of flexible design and is manufactured from a rubber material and/or an elastomer material.

12. The vehicle substructure as claimed in claim 1, wherein the at least one adaptable air-guiding element is adaptable and pivotable by means of at least one actuator device.

13. The vehicle substructure as claimed in claim 12, wherein the at least one actuator device is operatively connected to at least one control device, and wherein the at least one adaptable air-guiding element can be set using the at least one actuator device depending on at least one operating state of a carrier vehicle and on a driving speed of the carrier vehicle.

14. The vehicle substructure as claimed in claim 1, wherein the vehicle component comprises at least one charge air cooling device, and wherein the at least one structure air flow is supplied as cooling air thereto.

15. The vehicle substructure as claimed in claim 1, wherein the vehicle substructure is designed as a rear wing apparatus.

16. The vehicle substructure as claimed in claim 1, wherein the air-guiding element is arranged in the forward direction of a carrier vehicle beginning in front of the wing device.

* * * * *